United States Patent
Heidari et al.

(10) Patent No.: US 7,315,571 B1
(45) Date of Patent: Jan. 1, 2008

(54) METHOD AND APPARATUS FOR A VARIABLE BANDWIDTH MULTI-PROTOCOL X-DSL TRANSCEIVER

(75) Inventors: Sam Heidari, Menlo Park, CA (US); Behrooz Rezvani, Pleasanton, CA (US); Raminder S. Bajwa, Palo Alto, CA (US); Jacky Chow, Mountain View, CA (US); Avadhani Shridhar, Santa Clara, CA (US); Dale Smith, Fremont, CA (US); John Gevargiz, Manhattan Beach, CA (US); Saman Behtash, Bergamo (IT)

(73) Assignee: Ikanos Communication Inc, Fremont, CA (US)

( * ) Notice: Subject to any disclaimer, the term of this patent is extended or adjusted under 35 U.S.C. 154(b) by 456 days.

(21) Appl. No.: 09/837,914

(22) Filed: Apr. 18, 2001

Related U.S. Application Data (60) Provisional application No. 60/197,713, filed on Apr. 18, 2000.

(51) Int. Cl.
*H04B 1/38* (2006.01)

(52) U.S. Cl. ............... 375/222; 375/316; 375/340; 375/267; 375/343; 370/468; 370/334; 370/465; 455/103; 455/422.1; 455/69

(58) Field of Classification Search ............... 375/222, 375/260, 220, 240, 316, 340, 267, 343; 370/210, 370/395, 468, 334, 465; 455/103, 422.1, 455/69
See application file for complete search history.

(56) References Cited

U.S. PATENT DOCUMENTS

| | | | | |
|---|---|---|---|---|
| 4,695,825 A | * | 9/1987 | Bloy et al. | 341/118 |
| 5,781,728 A | * | 7/1998 | Rybicki et al. | 709/230 |
| 5,909,463 A | * | 6/1999 | Johnson et al. | 375/220 |
| 6,005,893 A | | 12/1999 | Hyll | |
| 6,137,839 A | * | 10/2000 | Mannering et al. | 375/260 |
| 6,314,102 B1 | * | 11/2001 | Czerwiec et al. | 370/395.6 |
| 6,466,088 B1 | * | 10/2002 | Rezvani et al. | 330/51 |
| 6,512,739 B1 | * | 1/2003 | Heidari et al. | 370/210 |

* cited by examiner

*Primary Examiner*—Chieh M. Fan
*Assistant Examiner*—Eva Zheng
(74) *Attorney, Agent, or Firm*—IP Creators; Charles C Cary (57) ABSTRACT

A transceiver for communicating a multi-tone modulated communication channel on a subscriber line. The transceiver includes: a digital signal processor (DSP) with a Fourier transform module and an analog front end (AFE). The DSP determines an available range of frequencies on the subscriber line and expands or contracts the tone spacing of each of a fixed number "N" of tones accordingly by decreasing or increasing the processing interval associated with the Fourier transform of each tone set. The AFE performs digital-to-analog conversion of the multi-tone modulated communication channel at rates compatible with the processing interval of the Fourier transform module; whereby the range of frequencies spanned by the modulated tones on the subscriber line conforms to the available of frequencies on the subscriber line.

10 Claims, 7 Drawing Sheets

| | Setup Options | | |
|---|---|---|---|
| 214 | B | C | D |
| 4.3125 kHz Tone Spacing | | Ch. 3-4 | Ch. 3-6 |
| 8.625 kHz Tone Spacing | Ch. 1-2 | Ch. 1 | |

METHOD AND APPARATUS FOR A VARIABLE BANDWIDTH MULTI-PROTOCOL X-DSL TRANSCEIVER

CROSS REFERENCE TO RELATED APPLICATION

This application claims the benefit of prior filed co-pending Provisional Application No. 60/197,713 filed on Apr. 18, 2000 entitled "Programmable and Variable Bandwidth DMT Engine" which is incorporated herein by reference in their entirety as if fully set forth herein.

BACKGROUND OF THE INVENTION

1. Field of Invention

The field of the present invention relates in general to modems and more particularly to a method and apparatus for a variable bandwidth X-DSL modem.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. Currently there are over ten discrete X-DSL standards, including: G.Lite, ADSL, VDSL, HDSL2, SHDSL, and other DSLs all of which are broadly identified as X-DSL.

Currently there are over ten discrete XDSL standards, including: G.Lite, ADSL, VDSL, SDSL, MDSL, RADSL, HDSL, etc. Within each standard there are at least two possible line codes, or modulation protocols, discrete multi-tone (DMT) and carrierless AM/PM (CAP). A typical DMT system utilizes a transmitter inverse discrete Fourier transform (IDFT) and a receiver discrete Fourier transform (DFT). The following patents are related to DMT modems: U.S. Pat. No. 5,400,322 relates to bit allocation in the multi-carrier channels; U.S. Pat. No. 5,479,447 relates to bandwidth optimization; U.S. Pat. No. 5,317,596 relates to echo cancellation; and U.S. Pat. No. 5,285,474 relates to equalizers. The following patents are related to CAP modems: U.S. Pat. No. 4,944,492 relates to multidimensional pass band transmission; U.S. Pat. No. 4,682,358 relates to echo cancellation; and U.S. Pat. No. 5,052,000 relates to equalizers. Each of these patents is incorporated by reference as if fully set forth herein.

XDSL modems are typically installed in pairs, with one of the modems installed in a home or business and the other in the telephone companies central office (CO) switching office servicing that home. This provides a direct dedicated connection to the home or office from a line card at the central office on which the modem is implemented through the subscriber line or local loop.

Each installation represents a sizeable expense in hardware and service labor to provision the central office. The expense may not always be amortized over a sufficient period of time due the relentless introduction of new and faster xDSL standards each of which pushes the performance boundaries of the subscriber line in the direction of increasing bandwidth and signal integrity. As each new standard involves, line cards must typically be replaced to upgrade the service. Not all subscriber lines qualify for the higher bandwidths offered by the evolving X-DSL protocols. Subscriber line length, i.e. the distance from the home or business to the central office is one of the primary factors determining the ability of a subscriber line to support higher data rates. Evolving standards like VDSL call for data rates from 3.75 Mega Bits per second (Mbps) up to 13 Mbps and higher. Typically only a small percentage of the installed subscriber lines with loop distances less than 2000 feet from the central office will qualify for the upper data rates, the higher bandwidths. The hardware and processing capability needed to deliver high bandwidths to these short loops is expensive, and can not be utilized on the longer subscriber loops.

What is needed is a less rigid signal processing architecture that supports scalability of CO resources, and allows a more flexible hardware response to the evolving XDSL standards and the problems associated with providing hardware to handle each new standard.

SUMMARY OF THE INVENTION

An apparatus and method is disclosed for a variable bandwidth X-DSL modem. The modem implements a discrete multi-tone (DMT) line code with varying tone spacing depending on the bandwidth availability on selected subscriber lines. For short subscriber loops that qualify for high data rates the spacing between tones in a tone set is expanded to support the higher data rates. For longer subscriber loops that do not qualify for high data rates the same tone set at a more compact tone spacing is utilized to modulate the subscriber line data. The benefit to this approach is that the Fourier engine portion of the modem needed to modulate and demodulate the channels uses the same number of tones to support both high and low data rates. This reduces the overall cost and complexity of the modem and avoids a significant increase in system cost for limited symmetrical applications for which a larger discrete Fourier transform DFT and inverse discrete Fourier transform IDFT would otherwise be required. When utilized in a multi-channel environment the variable bandwidth approach of the current invention allows pipelining of multiple channels across corresponding subscriber lines at a mix of data rates.

BRIEF DESCRIPTION OF THE DRAWINGS

These and other features and advantages of the present invention will become more apparent to those skilled in the art from the following detailed description in conjunction with the appended drawings in which:

FIGS. 3 A-B are signal diagrams showing a common tone set with default tone spacing and expanded tone spacing for handling variable bandwidth VDSL communications over long and short subscriber loops respectively.

FIGS. 4 A-B are hardware block diagrams showing a detailed logical view of the logical modem shown in FIG. 2 during the transmission and reception of a default tone spacing and an expanded tone spacing respectively.

FIG. 6 A shows possible session allocations for the multi-channel logical modem shown in FIG. 2.

DETAILED DESCRIPTION OF THE EMBODIMENTS

An apparatus and method is disclosed for a variable bandwidth X-DSL modem. The modem implements a discrete multi-tone (DMT) line code with varying tone spacing depending on the bandwidth availability on selected subscriber lines. For short subscriber loops that qualify for high data rates the spacing between tones in a tone set is expanded to support the higher data rates. For longer subscriber loops that do not quality for high data rates the same tone set at a more compact tone spacing is utilized to modulate the subscriber line data. The benefit to this approach is that the Fourier engine portion of the modem needed to modulate and demodulate the channels uses the same number of tones to support both high and low data rates. This reduces the overall cost and complexity of the modem and avoids a significant increase in system cost for limited symmetrical applications for which a larger discrete Fourier transform DFT and inverse discrete Fourier transform IDFT would otherwise be required. When utilized in a multi-channel environment the variable bandwidth approach of the current invention allows pipelining of multiple channels across corresponding subscriber lines at a mix of data rates. The apparatus may be applied with equal advantage in wired and wireless media.

In an embodiment of the invention the X-DSL transceiver implements the DMT protocol and includes a digital signal processor (DSP) and an analog front end (AFE) coupled to at least one subscriber line. A DFT/IDFT engine is implemented in the DSP with a DFT portion to convert digitized tone sets on a receive path for each channel to digitized symbols and an IDFT portion to convert for the digitized symbols on the transmit path to digitized tone sets. The DFT/IDFT engine provides variable tone spacing for the at least one channel. A variable rate interpolator couples to the IDFT portion of the DFT/IDFT engine and sets the sampling rate at the output of the IDFT to match the sampling rate of a digital input to the digital-to-analog (DAC) portion of the AFE. A variable rate decimator couples to the digital output of the AFE and sets the sampling rate at the digital output of the AFE to match the sampling rate at the input of the DFT portion of the DFT/IDFT engine. In an embodiment of the invention a scheduler couples to the DFT/IDFT engine for scheduling channels to be processed by the DFT/IDFT engine during each processing interval. An initialization procedure is used to determine appropriate tone spacing to be used for the channel based on the loop qualifications of the channel.

Figure 1:
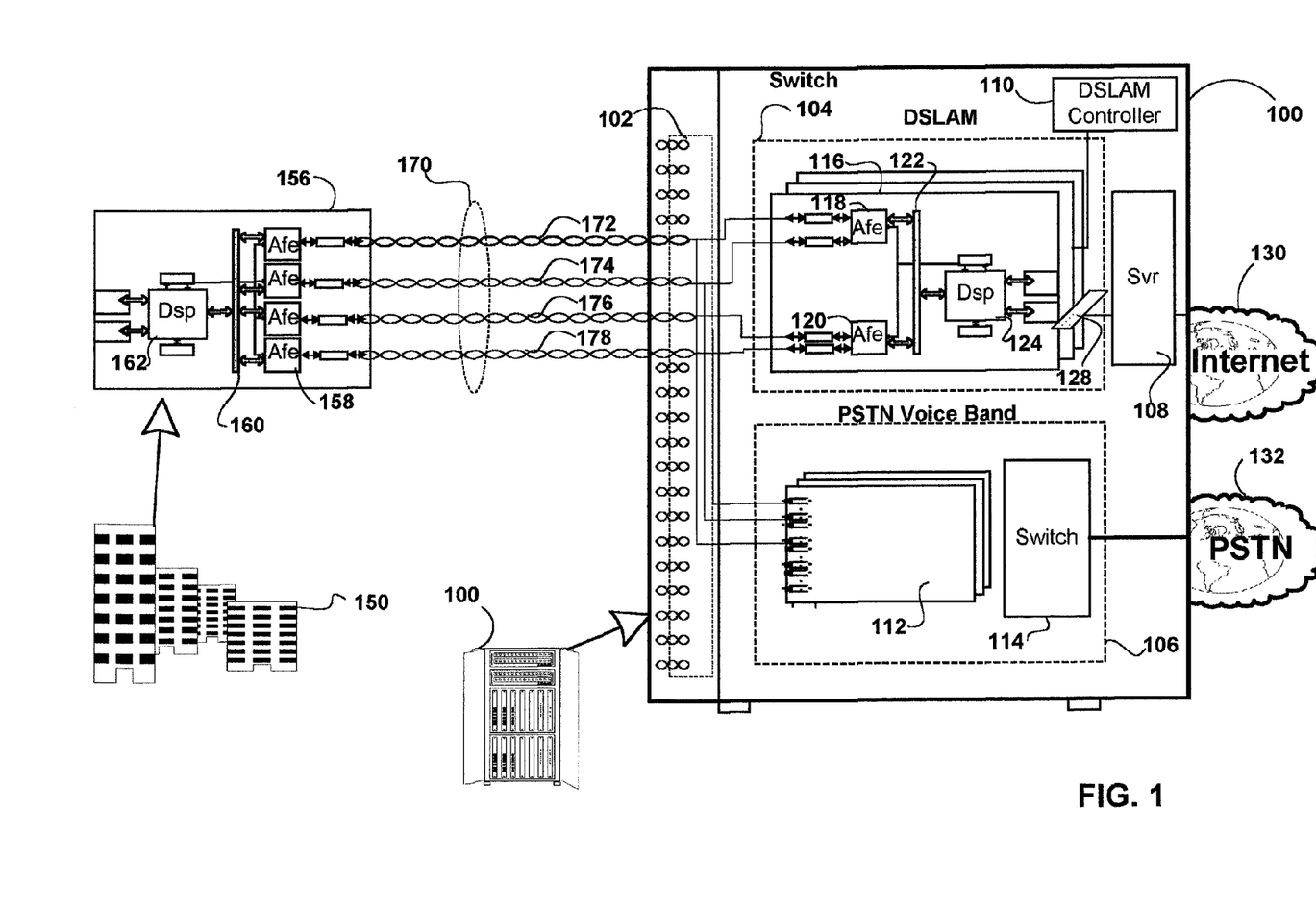
FIG. 1 shows a communication system with a pair of multi-protocol multi-channel modem line cards coupled to one another by a binder of subscriber lines between a public switched telephone network (PSTN) central office (CO) and a remote site.

FIG. 1 shows a communication system with a pair of multi-protocol multi-channel modem line cards coupled to one another by a binder of subscriber lines between a public switched telephone network (PSTN) central office (CO) and a remote site. The system includes a CO 100 and a remote line card 156 positioned at a remote terminal 150. The CO and remote line card are coupled to one another via a subscriber line binder 170 which includes individual subscriber lines 172, 174, 176, 178.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. The line cards are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card includes a plurality of AFE's 118-120 each capable of supporting a plurality of subscriber lines. The AFEs are coupled via a packet based bus 122 to the DSP 124. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO each received channel is converted within the corresponding AFE to a digitized data sample which is sent to the DSP for demodulation. The DSP is capable of multi-protocol support for all subscriber lines to which the AFE's are coupled. Communications between AFE's and DSP(s) may be packet based, in which embodiment of the invention a distributed architecture such as will be set forth in the following FIG. 2 may be implemented. In FIG. 1 the line card 116 is coupled to a back-plane bus 128 which may be capable of offloading and transporting low latency X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier is used in the above mentioned packet based embodiment to track each packet as it moves in an upstream or downstream direction between the AFE and DSP. In an alternate embodiment of the invention discrete modems would each couple to an associated one of the subscriber lines rather than the logical modem shown.

At the remote site a similar line card architecture is shown for line card 156 which forms a plurality of logical modems connected to corresponding ones of subscriber lines 172, 174, 176, 178. That line card includes AFEs 158, a packet bus 160 and a DSP 162. In an alternate embodiment of the invention the termination at the remote site 150 would be a set of discrete modems each coupled to an associated one of the subscriber lines rather than the logical modem shown. These modules, AFE and DSP, may be found on a single universal line card, such as line card 156 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

Figure 2:
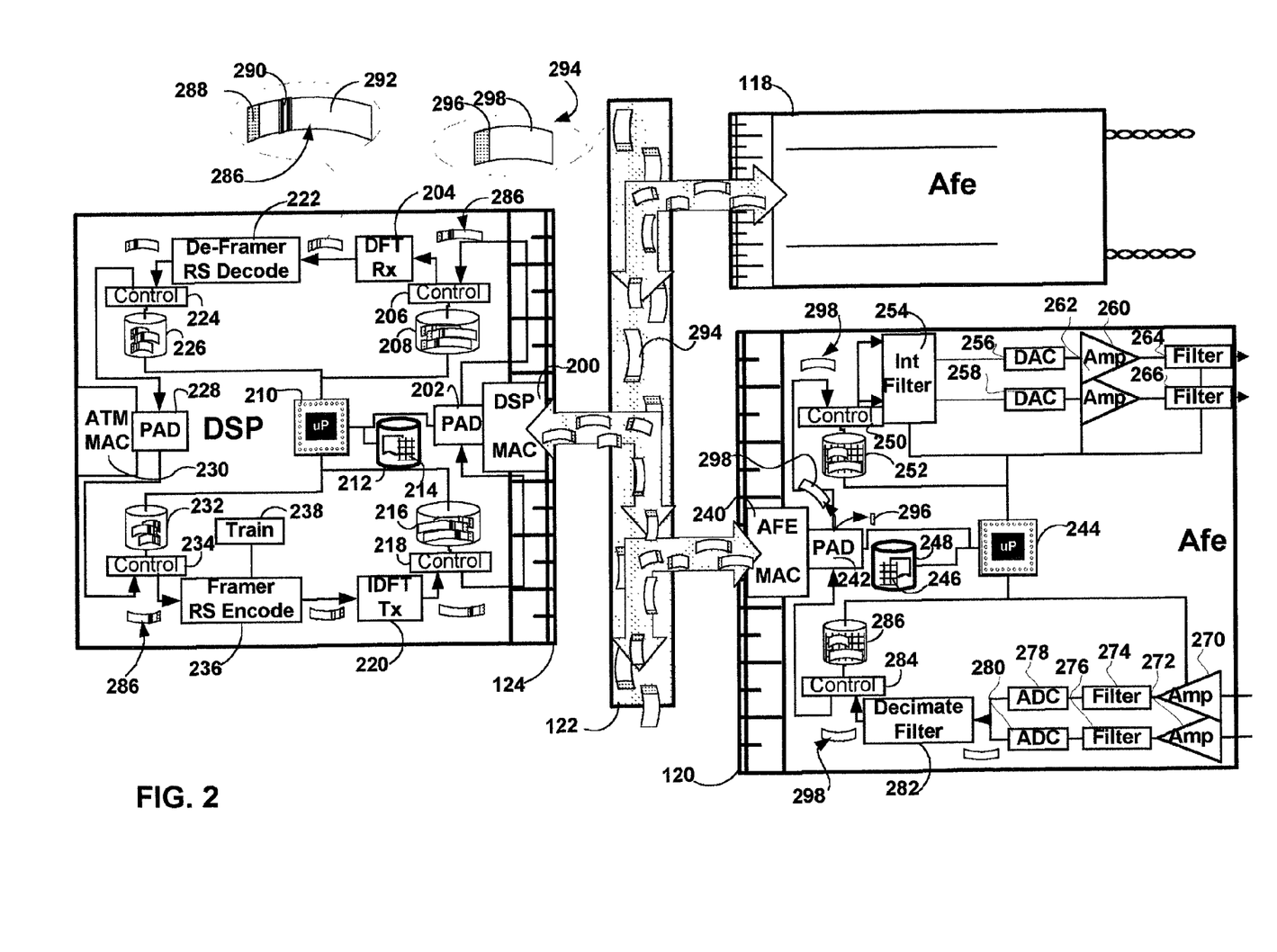
FIG. 2 is a detailed hardware block diagram of one of the logical modem line cards shown in FIG. 1.

FIG. 2 is a detailed hardware block diagram of one of the logical modem line cards shown in FIG. 1. In this embodiment of the invention a packet based multi-channel transmission architecture is utilized to implement communications across the logical modem. In this architecture a DSP 124 handles processing for a number of channels of upstream and downstream subscriber line communications via a number of AFE's. Each AFE in turn accepts packets associated with a plurality of subscriber lines to which each AFE is coupled. Packet based processing of raw data both between a DSP and AFE as well as within each DSP and AFE is implemented. Packet processing between DSP and AFE modules involves transfer of bus packets 294 each with a header portion 296 and data portion 298. The header contains information correlating the data with a specific channel and direction, e.g. upstream or downstream, of communication. The data portion contains for upstream traffic digitized samples of the received data for each channel and for downstream packets digitized symbols for the data to be transmitted on each channel. Packet processing within a DSP may involve device packets 286. The device packets may include a header 288, a control portion 290 and a data portion 292. The header serves to identify the specific channel and direction. The header may contain control information for the channel to be processed. The control portion 290 may also contain control portions for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line.

These modules, AFE and DSP, may be found on a single universal line card, such as line card 116 in FIG. 1. They may alternately be displaced from one another on separate line cards linked by a DSP bus. In still another embodiment they may be found displaced across an ATM network.

DSP line card 116 includes one or more DSP's. In an embodiment of the invention each may include structures set forth in the figure for handling of multiple line codes and multiple channels. The line card includes, a DSP medium access control (MAC) 200 which handles packet transfers to and from the DSP bus 122. The MAC couples with a packet assembler/disassembler (PAD) 202. For received DSP bus packets, the PAD handles removal of the DSP bus packet header 296 and insertion of the device header 288 and control header 290 which is part of the device packet 286. The content of these headers is generated by the core processor 212 using statistics gathered by the de-framer 222. These statistics may include gain tables, or embedded operations channel communications from the subscriber side. The PAD embeds the required commands generated by the core processor in the header or control portions of the device packet header. Upstream device packets (Receive packets) pass into a first-in-first-out FIFO buffer 208 which is controlled by FIFO controller 206. These packets correspond with multiple protocols and multiple channels. Each is labeled accordingly. The controller 206 operates as a scheduler, handling the interleaving (See FIGS. 6A-D) and delivery of each packet to the discrete Fourier transform (DFT) engine 204 which is the next process on the upstream (receive) path (See FIGS. 6A-D).

The receive processing engine 204 implements a discrete Fourier transform (DFT) on the raw digital data transforming a complete tone set for one channel from the time to the frequency domain. The outputs are complex number coefficients, with each complex number containing the phase and amplitude for a corresponding tone of the tone set. The DFT engine 204 fetches packets and processes the data in them in a manner appropriate for the protocol, channel and command instructions, if any, indicated by the packet header. The DFT engine is reconfigurable to support varying numbers of tones depending on the protocol implemented for a specific channel. Each tone set corresponds to a symbol. The DFT engine processes successive tone sets for each channel periodically. The processing interval of each DFT engine is programmable. The processing interval for selected ones of the channels with loop qualification for higher data rates, i.e. "short loops", is conducted at an integer fraction of the processing interval of 250 micro seconds called for by the existing X-DSL DMT standards. The processing of successive tone sets of other channels with loop qualification which do not support higher data rates is conducted at the periodicity called for by the existing X-DSL standard. Currently the X-DSL standard calls for processing periodicity of 250 micro seconds for successive tone sets of each channel, which corresponds to a tone spacing of 4.3125 kHz (See FIG. 3A). Utilizing the current invention some of these channels with loop qualification for higher data rates may be periodically processed at intervals which are an integer fraction, e.g. ½ of the standard. Where the processing periodicity for successive tone sets is ½ the standard or 125 micro seconds the tone spacing expands to 8.625 kHz. (See FIG. 3B). This allows the same DFT engine with the same sample size, the same number of tones, to provide up to twice the upstream bandwidth. Other channels which do not qualify for higher data rates are processed at the 250 micro second interval called for by the standard.

The higher throughput of the DFT engine may be achieved with a single high speed DFT engine or a set of discrete DFT engines operating in parallel on the successive tone sets of each channel.

The output of the DFT engine for each channel are successive sets of complex coefficients for each tone in the set. These contain phase and amplitude information for the information modulated on each tone and collectively make up a symbol. Next, the coefficients for each tone set are passed in a packet for each channel to the de-framer and decoder 222. In this module each symbol is decoded, Reed Solomon or other error correction is implemented and de framed. For a channel with expanded tone sets each frame includes two DMT symbols (See FIG. 5). This module reads the next device packet and processes the data in it in accordance with the instructions or parameters in its header.

The de-framed data is passed to the final FIFO buffer 226 which is controlled by controller 204. That data is then passed to the ATM pad 228 for wrapping with an ATM header and removal of the device header. The ATM MAC 230 then places the data with an ATM packet on the ATM network 130 (see FIG. 1).

Control of the receive modules, e.g. DMT engine 204 and de-framer decoder 222 as well as sub modules thereof is implemented as follows. The core processor 210 has DMA access to the FIFO buffer 226 from which it gathers statistical information on each channel including gain tables, or gain table change requests from the subscriber as well as instructions in the embedded operations portion of the channel. Those tables 214 are stored by the core processor in memory 212. When a change in gain table for a particular channel is called for the core processor sends instructions regarding the change in the header of the device packet for that channel via PAD 202 and writes the new gain table to a memory which can be accessed by the appropriate module, i.e. DMT module 204 or the appropriate sub module thereof as a packet corresponding to that channel is received by the module. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different X-DSL protocols, e.g. a packet with ADSL sample data followed by a packet with VDSL sampled data. Within the DMT Rx engine 204 for example, there may be sub modules with independent processing capability such as: a time domain equalizer, a cyclic prefix remover, a DFT, a gain scalar, a trellis decoder and a tone reorderer, as well as filters, a windowers . . . etc. Each of these sub modules has its counterpart on the DMT Tx engine 220 in the transmit path. Each of these may independently respond to successive device headers to change parameters between successive packets. For example as successive packets from channels implementing G.Lite, ADSL and VDSL pass through the DMT Tx engine the number of tones will vary from 128 for G.lite, to 256 for ADSL, to 2048 for VDSL. In accordance with the current invention VDSL may be implemented with 2048 tones with a processing periodicity of either 250 micro seconds as called for by the standard of some fractional part thereof. In alternate embodiments of the invention tone spacing expansion may be implemented on any protocol or tone set size. The framer and de-framer will use protocol specific information associated with each of these channels to look for different frame and super frame boundaries, including the dual symbol frame set forth in the following FIG. 5 for handling tone sets with expanded tone spacing.

On the downstream side, i.e. Transmit, the same architecture applies. ATM data which is unwrapped by PAD 228 is re-wrapped with a device header the contents of which are again dictated by the core processor 210. That processor embeds control information related to each channel in the packets corresponding to that channel. The device packets are then passed to the FIFO buffer 232 which is controlled by controller 234. The controller handles the sequencing and delivery of each packet to the Framer and Reed-Solomon (RS) encoder 236 and or sub modules thereof then processes these packets according to the information contained in their header or control portions of each device packet. The Framer then updates the device packet header and writes the resultant device packet to the IDFT transmit module 220. This module accepts the data and processes it for transmission. Transmission processing may include: tone ordering, trellis encoding, gain scaling, an IDFT, and cyclic prefix modules each with independent ability to read and respond to device headers. Where a specific channel loop qualifies for expanded tone spacing and concomitant higher data rates the IDFT implements these rates by periodically generating a tone set in an interval which is an integer fraction of that called for by the standard. Where the processing periodicity for successive coefficient sets is ½ the standard or 125 micro seconds the tone spacing expands to 8.625 kHz. (See FIG. 3B). This allows the same IDFT engine with the same sample size, the same number of tones, to provide up to twice the upstream bandwidth. Other channels which do not qualify for higher data rates have their coefficient sets transformed into tone sets at the 250 micro second interval called for by the standard. The DFT engine 204 and the IDFT engine 220 collectively form an IDFT/DFT engine which may be implemented in hardware, firmware or software. The IDFT/DFT engine may be implemented in discrete portions for the transmit and receive paths or as a single engine shared between the transmit and receive paths.

From the DMT Tx engine 220 each updated device packet with a digitized symbol(s) for a corresponding channel is placed in the FIFO buffer 216 under the control of controller 218. From this buffer the device packet is sent to PAD 202 where the device header is removed. The DSP PAD places the DSP packet 294 with an appropriate header onto the DSP bus 122 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet on the bus 122 directed to AFE 120 is detected by AFE MAC 240 on the basis of information contained in the packet header. The packet is passed to PAD 242 which removes the header 296 and sends it to the core processor 244. The packet's header information including channel ID is stored in the core processor's memory 248. The information is contained in a table 246. The raw data 298 is passed to a FIFO buffer 252 under the control of controller 250. Each channel has a memory mapped location in that buffer.

On the transmit path, the interpolator 254 reads a fixed amount of data from each channel location in the FIFO buffer. The amount of data read varies for each channel depending on the bandwidth of the channel. The amount of data read during each bus interval is governed by entries in the control table for each channel which is established during channel setup and is stored in memory 248. The interpolator up samples the data and low pass filters it to reduce the noise introduced by the DSP. Implementing interpolation in the AFE as opposed to the DSP has the advantage of lowering the bandwidth requirements of the DSP bus 122. The amount of interpolation will vary between channels with expanded tone spacing and channels with "standard" tone spacing of 4.3125 kHz. In an embodiment of the invention in which all analog stages run at a common sample rate the interpolation factor for a channel with expanded tone spacing will be less than that to which a channel with normal tone spacing will be subject. This allows all channels irrespective of tone spacing to be handled on analog stages with a common clock rate. In an alternate embodiment of the invention clock rates for the subsequent analog stage would vary depending on the tone spacing of the corresponding channel.

From the interpolator data is passed to the corresponding digital-to-analog converter (DACs) 256,258. The analog outputs of each DAC are introduced to the corresponding amplification and filtering stage i.e. amplifier 260 together with filter 264 and amplifier 262 together with filter 266, from which they are coupled to corresponding subscriber lines. Each of the transmit modules 254-266 may be coupled to the control processor 244. The parameters for each of the transmit modules, i.e. filter coefficients, amplifier gain etc. are controlled by the core processor using control parameters stored during session set up. For example, where successive packets carry packets with G.Lite, ADSL, and VDSL protocols the interpolation factors, sample rate, filter parameters for and the gain of the analog amplifiers will vary between the packets associated with each channel. This "on the fly" configurability allows a single transmit or receive pipeline to be used for multiple concurrent protocols.

On the upstream path, the receive path, individual subscriber lines couple to individual line amplifiers, e.g. 270-272, through splitter and hybrids (not shown). Each channel is passed to dedicated universal X-DSL filters 274-276. These filters, one per subscriber line, are configured to handle substantial attenuation of cross-talk from the transmit path for whichever of the X-DSL protocols may be implemented on the subscriber line. Next the ADC modules 278-280 convert the corresponding filtered analog signals to digital signals. Each channel may be subject to further digital filtering and decimation 278.

The amount of decimation will vary between channels with expanded tone spacing and channels with "standard" tone spacing. In an embodiment of the invention in which all analog stages run at a common sample rate the decimation factor for a channel with expanded tone spacing will be less than that to which a channel with normal tone spacing will be subject. This allows all channels irrespective of tone spacing to be handled on analog stages with a common clock rate. In an alternate embodiment of the invention clock rates for the subsequent analog stage would vary depending on the tone spacing of the corresponding channel.

As discussed above in connection with the transmit path, each of these components is configured on the fly for each new packet depending on the protocol associated with it. Each channel of data is then placed in a memory mapped location of FIFO memory 286 under the control of controller 284. Scheduled amounts of this data are moved to PAD 242 during each bus interval. The PAD wraps the raw data in a DSP header with channel ID and other information which allows the receiving DSP to properly process it.

Figure 3A:
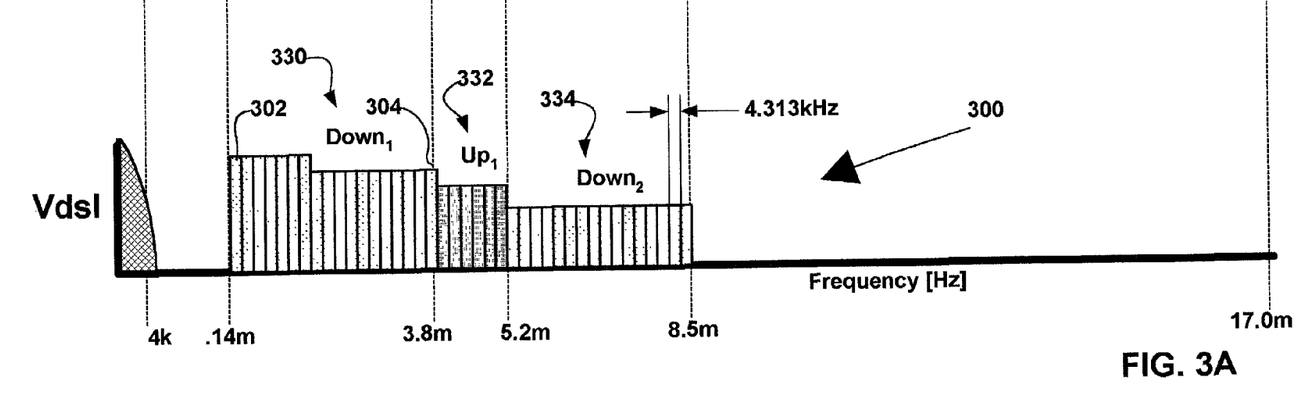
Figure 3B:
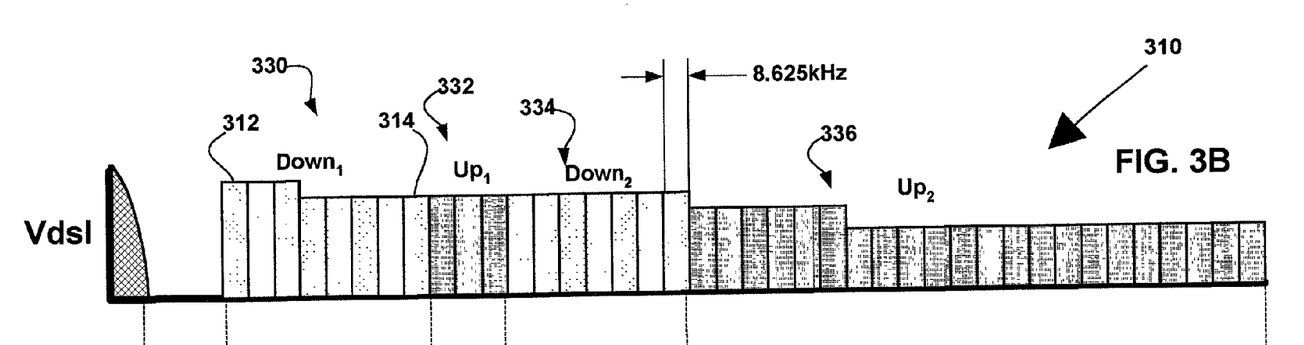

FIGS. 3 A-B are signal diagrams showing a common set of DMT tones with a standard tone spacing 300 of 4.3125 kHz (See FIG. 3A) and an expanded tone spacing of 8.625 kHz (See FIG. 3B). The variation in tone spacing is achieved by varying the processing periodicity for successive symbol/tone sets from the X-DSL standard of 250 microseconds per symbol per tone set to 125 microseconds per symbol per tone set for each channel. Each tone set for the communication channel 300 shown in FIG. 3A is periodically processed by the DFT/IDFT at an interval of 250 microseconds. Each tone set for the communication channel 310 shown in FIG. 3B is periodically processed by the DFT/IDFT at an interval of 125 microseconds. The number of tones in FIG. 3A is the same as the number in FIG. 3B, thus the same sample size DFT/IDFT may be used to process both channels. In FIG. 3A there are two downstream communication bandwidths 330 and 334 and one upstream communication bandwidth 332. The first downstream communication channel is bounded by lower tone 302 and an upper tone 304 each with a corresponding tone number. In FIG. 3B the same tone set has been expanded to provide coverage for the same two downstream communication bandwidths 330 and 334, the same one upstream communication bandwidth 332 and a new upstream bandwidth 336. This latter frequency range is accessible through the same DFT/IDFT sample size due to the decreased period of the sample/tone set processing effected by the DFT/IDFT engines for channel 310. Both the number of tones and the boundary tone numbers for each upstream and downstream communication bandwidth have changed. The first downstream band 330 is bounded by tones referenced as 312 and 314. The tone orderer which is a sub module (not shown) of the framer and RS encoder 236 (See FIG. 2) on the transmit path and the tone de-orderer (not shown) which is a sub module of the de-framer and RS decoder 222 on the receive path vary the tone numbering accordingly during the processing of each of the packets corresponding with channels 300 and 310.

Figure 4A:
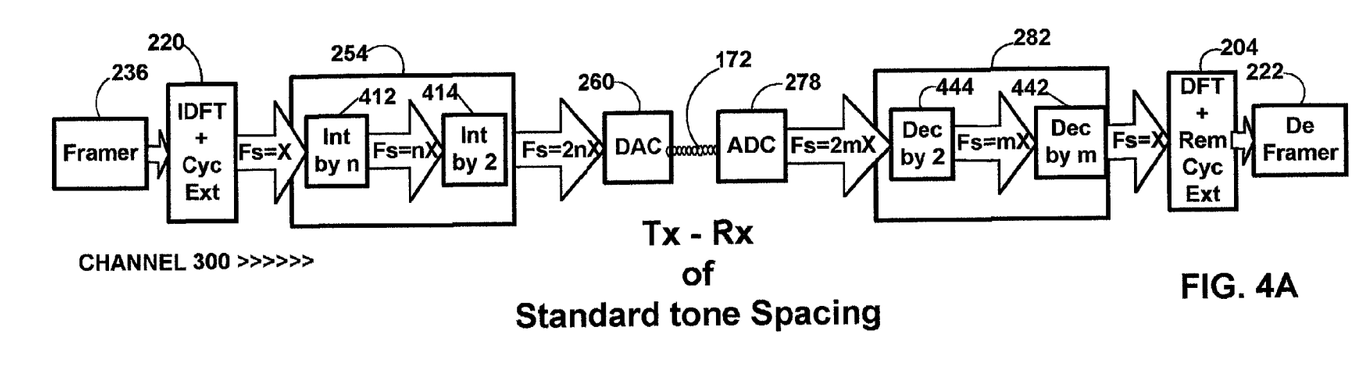
Figure 4B:
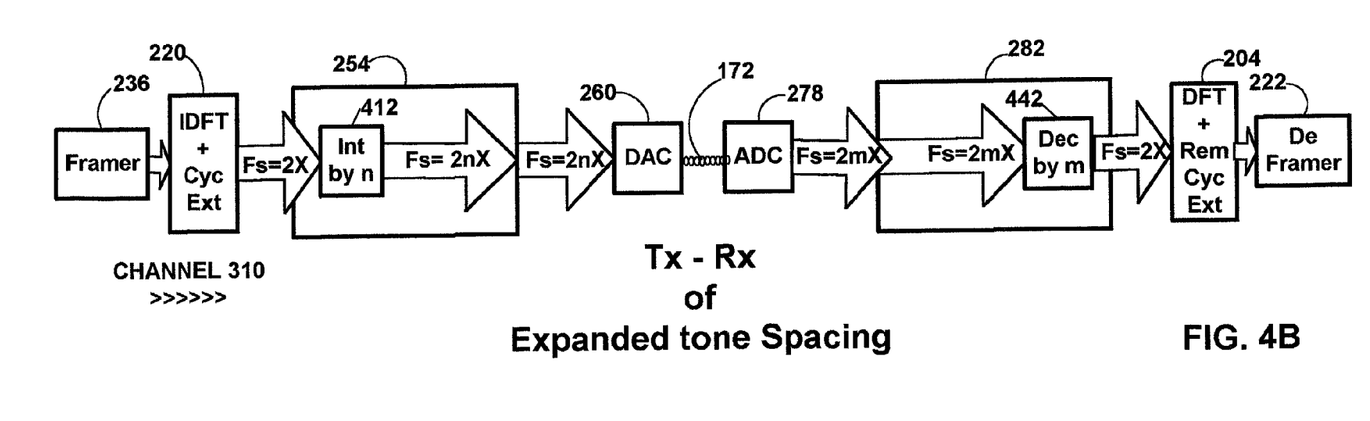

FIGS. 4 A-B are hardware block diagrams showing a detailed logical view of the logical modem shown in FIG. 2 during the transmission and reception of the channels 300 and 310 shown in FIGS. 3A-B respectively. In FIG. 4A the signal processing for channel 300 with a standard tone spacing is shown. In FIG. 4B the signal processing for channel 310 with an expanded tone spacing is shown. The X-DSL transceiver of the current invention may be implemented either as a multi-channel device capable of handling concurrently channels with both standard and expanded tone sets. In an alternate embodiment of the invention the X-DSL transceiver may be implemented as a single channel device capable of switching from standard tone spacing to expanded tone spacing depending on the loop qualification of the subscriber line to which it is coupled.

In FIG. 4A the processing of the first channel 300 with default tone spacing is shown. After framing, tone ordering, RS encoding and gain scaling in module 236 the coefficients for each symbol are converted in the IDFT module 220 from the frequency to the time domain. This conversion occurs at a sampling frequency of Fs=X. The sampling frequency equals the number of tones in a tone set plus a specified prefix or suffix multiplied by the one over the standard processing interval of 250 microseconds. Next the digital time domain data for each symbol set is passed to the variable rate interpolator 254 which in the embodiment shown is part of the AFE, though such need not be the case.

In the interpolator 254 there are logically two interpolation stages 412 and 414. In stage 414 the an interpolation by a factor "n" occurs followed by a further interpolation by a factor, e.g. 2 in stage 412. The interpolation that occurs in stage 412 is common to both the signal processing for channel 300 with standard tone spacing and channel 310 with expanded tone spacing. The interpolation in stage 414 is necessary when the DAC 260 runs at a constant rate for the signal processing of either channel 300 or 310. The channel 300 is subject to an additional interpolation in stage 414. The interpolation factor in this stage is the inverse of the integer fraction by which the processing periodicity of channel 310 correlates with the processing periodicity of channel 300. In this example, that factor is 1:1.5=2. The sampling frequency at the input to the DAC for channel 300 is Fs=2nX. The DAC 260 converts channel 300 from a digital to an analog signal which is output on subscriber line 172. On the receive side ADC 278 samples at Fs=2mX. Then in variable rate decimator 282 there are two decimation stages 444 and 442. In the first 444 decimation by the inverse integer fraction ½ is followed by decimation by the factor m in stage 442. At the input to the DFT 204 the sampling frequency is Fs=X. Subsequently each coefficient set is gain scaled, decoded, tone reordered and deframed in module 222.

In FIG. 4B the processing of the second channel 310 with expanded tone spacing is shown. After framing, tone ordering, RS encoding and gain scaling in module 236 the coefficients for each symbol are converted in the IDFT module 220 from the frequency to the time domain. This conversion occurs at a sampling frequency of Fs=2X. Next the digital time domain data for each symbol set is passed to the variable rate interpolator 254 which in the embodiment shown is part of the AFE, though such need not be the case.

In the variable rate interpolator 254 there is logically only one interpolation stage 412. The interpolation that occurs in stage 412 is common to both the signal processing for channel 300 with standard tone spacing and channel 310 with expanded tone spacing. The sampling frequency at the input to the DAC for channel 310 is Fs=2nX. The DAC 260 converts channel 310 from a digital to an analog signal which is output on subscriber line 172. On the receive side ADC 278 samples at Fs=2mX. Then in variable rate decimator 282 there is one decimation stage 442 where decimation by a factor m occurs. At the input to the DFT 204 the sampling frequency is Fs=2X. This is the frequency at which each tone set of channel 310 is converted from the time to the frequency domain as a set of complex coefficients. Subsequently each coefficient set is gain scaled, decoded, tone reordered and deframed in module 222.

Figure 5:
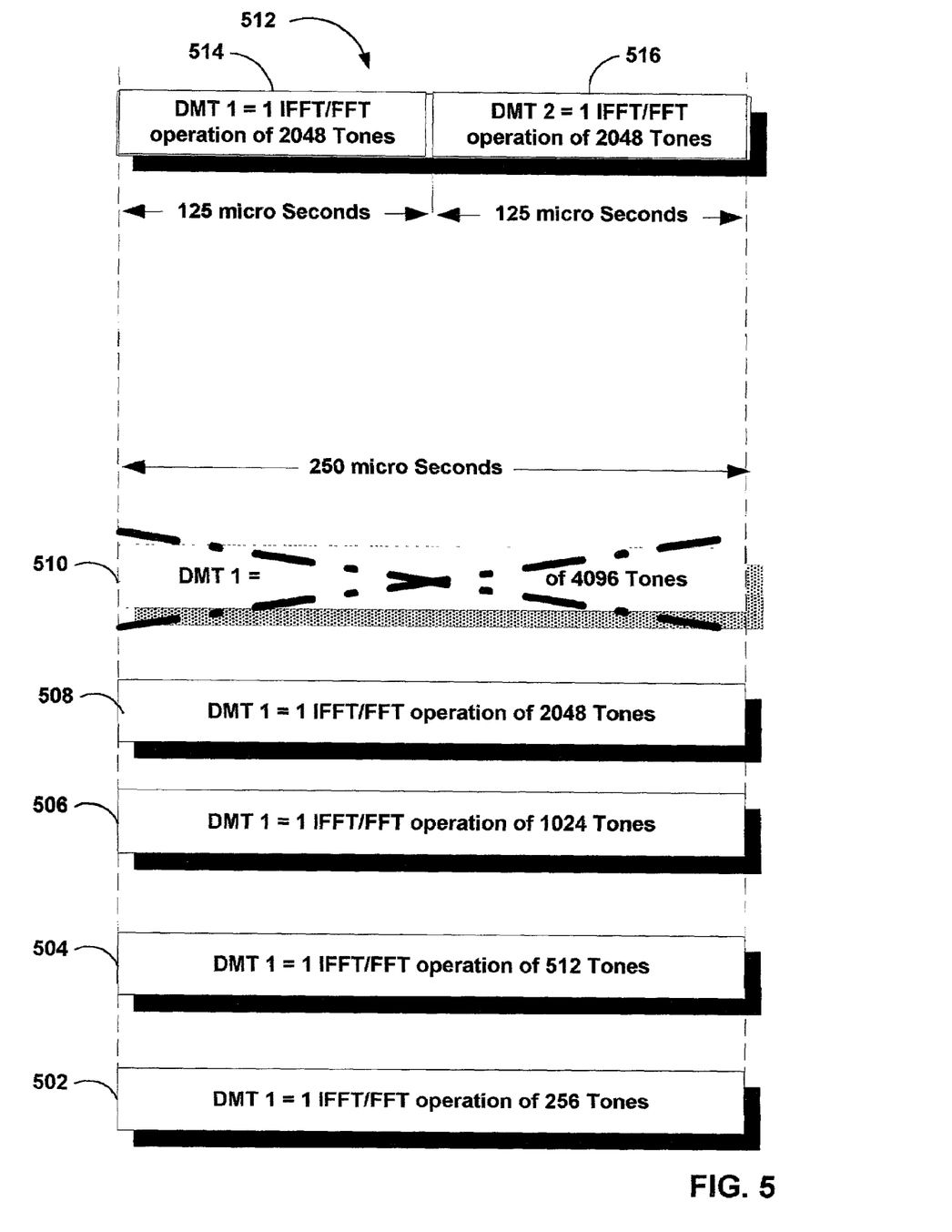
FIG. 5 shows the various DMT frame sizes associated with the logical modem shown in FIG. 2, including a new frame structure suitable for the expanded tone spacing associated with short subscriber loops which qualify for elevated data rates.

FIG. 5 shows the various DMT frame sizes associated with the logical modem shown in FIG. 2, including a new frame structure suitable for the expanded tone spacing associated with short subscriber loops which qualify for elevated data rates. Various standard DMT frames 502-510 are shown each varying in size depending on the DMT protocol and symbol size. The frames 502-510 are those associated with current implementations of the VDSL DMT standard. All frames contain one DMT symbol and are processed at the standard processing interval of 250 microseconds per symbol per channel. An "X" is drawn through frame 510 to reflect the fact that the DFT/IDFT does not need to support the full range of tone sets called for by the VDSL standard. Instead by reducing the processing interval for short haul channels by an integer fraction, e.g. ½ as discussed above a DFT/IDFT engine with only 2048 tones can process a channel with the same fidelity as a DFT/IDFT with a 4096 point sample/tone set. This greatly reduces the complexity of the logical modem. A new frame structure 512 is proposed to handle the channels which are processed at this expanded tone spacing. That frame includes two symbols 514-516. In an alternate embodiment of the invention there would be two discrete frames.

Figure 6A:
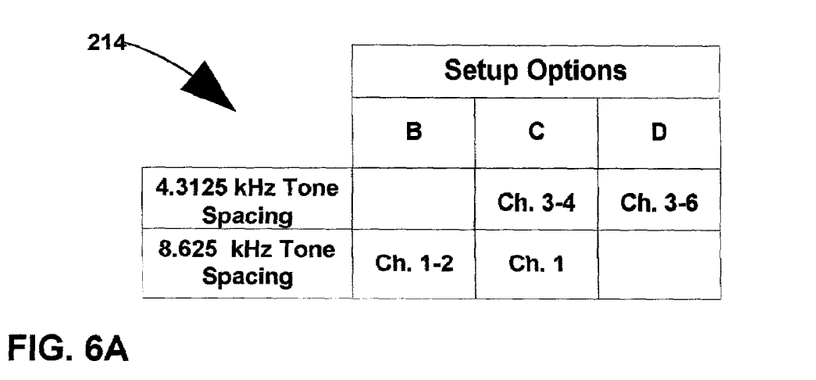
Figure 6B:
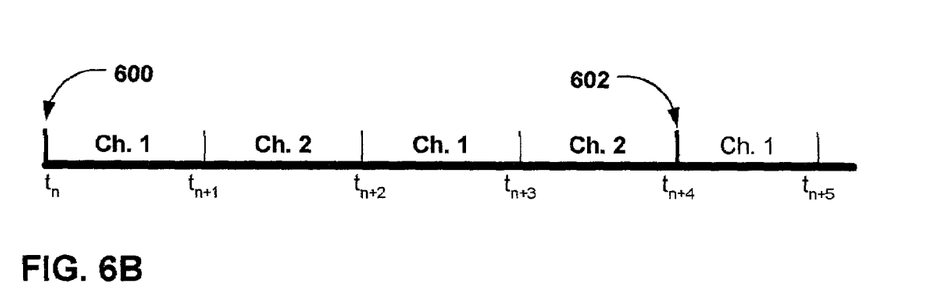
FIGS. 6B-D show the possible scheduling in the DSP for each of the channels of each of the three sessions shown in FIG. 6A.
Figure 6C:
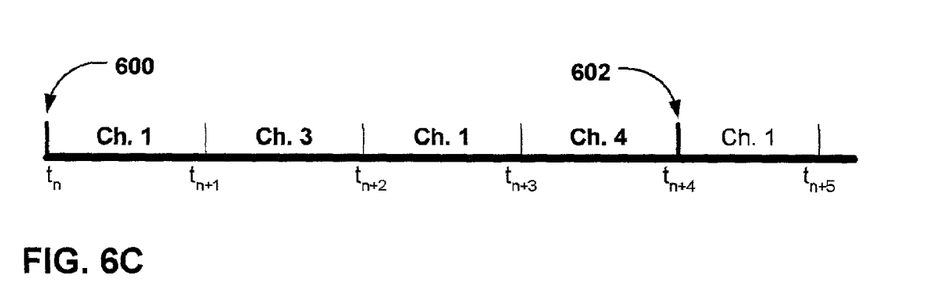
Figure 6D:
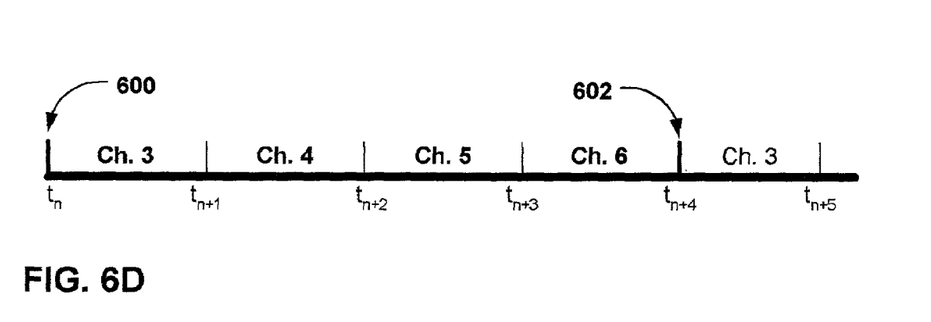

FIG. 6A shows possible session allocations for the multichannel logical modem shown in FIG. 2. FIGS. 6B-D show the possible scheduling in the DSP for each of the channels of each of the three sessions shown in FIG. 6A Scheduling in the DSP 124 on the upstream and downstream paths is handled by controllers 206 and 234 respectively operating from session setup tables 214 stored in memory 212 as shown in FIG. 2. These controllers operate as schedulers handling the interleaving (See FIGS. 6A-D) and delivery of each packet to the discrete Fourier transform (DFT) engine 204.

In FIG. 6A the modem is shown to support either two channels with expanded tone spacing (See FIG. 6B); or one expanded channel and two standard channels (See FIG. 6C; or four standard channels (See FIG. 6D). In each of FIGS. 6B-D a processing interval for the DFT/IDFT is shown. The boundaries of the processing interval are referenced as 600-602. Within this interval from $t_n$ to $t_{N+4}$ there are subintervals during which all active channels are processed. The total time elapsed during the processing interval from 600-602 equals the standard processing interval of 250 microseconds called for by the X-DSL DMT standards. Possible channels allocations or interleavings are shown for each of the three session loadings B, C, D shown in FIG. 6A are shown in corresponding FIGS. 6B, 6C and 6D respectively. A channel with expanded tone spacing has more than one symbol/tone set processed in the standard processing interval of 250 microseconds. In FIG. 6B both channels 1-2 are accorded expanded tone sets and both are processed twice in the standard processing interval. In FIG. 6C the expanded tone set channel 1 is processed twice in the standard processing interval. The channels 3 and 4 which are accorded standard tone sets are processed once in the standard processing interval. In FIG. 6D no channel is accorded expanded tone sets and all are processed once in the standard processing interval.

Figure 7:
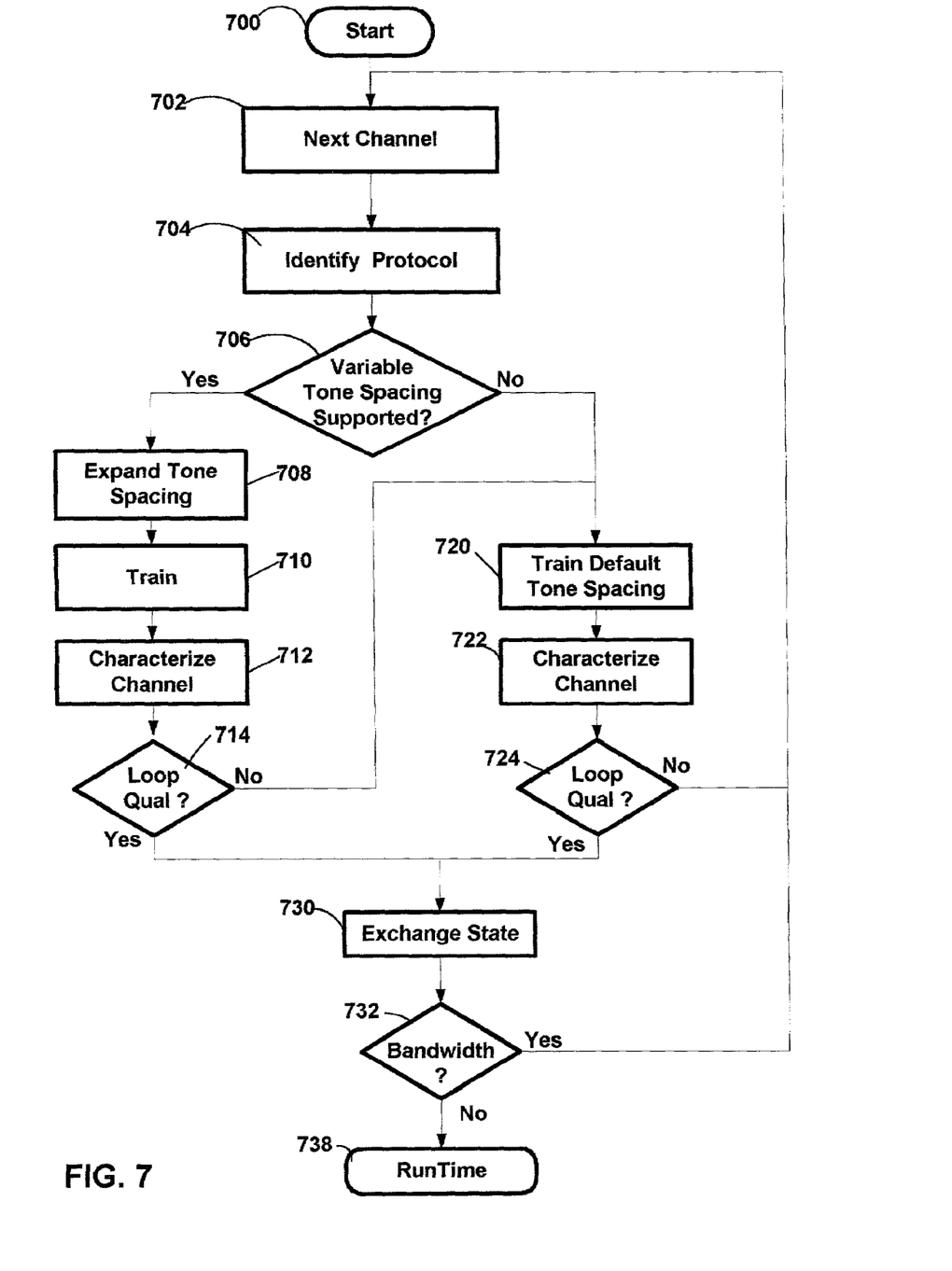
FIG. 7 is a process flow diagram of the setup phase of operation of the modem shown in FIG. 2.

FIG. 7 is a process flow diagram of the setup phase of operation of the modem shown in FIG. 2. Processing begins at process 700 in which the modem is initialized. Control then passes to process 702 in which the DSLAM controller 110 (See FIG. 1) allocates another channel to the modem line card. Next in process 704 the X-DSL DMT protocol for the channel is identified. Control then passes to decision process 706. In decision process 706 a determination is made for both the CO and subscriber modem units as to whether expanded tone spacing is supported. If expanded tone sets are supported control passes to process 708. In process 708 the spacing of the expanded tone set is established by setting the processing interval for each of the symbol/tone sets for that channel at an integer fraction or multiple of the standard processing interval of 250 microseconds. Control then passes to process 710 in which the training for the channel is effected. Then in process 712 the channel is characterized for each tone in the tone set. Next in decision process 714 a determination is made as to whether the subscriber loop which carries the channel qualifies for high data rates associated with an expanded tone spacing. If not control passes to process 720. If the channel's subscriber line loop qualifies as a short haul line/channel which supports the expanded tone spacing then control passes to process 730 in which state information is exchanged between the CO and subscriber modems.

If alternately, in decision process 706 a determination is made that variable tone spacing is not supported by either modem then control passes to process 720. In process 720 training is conducted at the standard tone spacing of 4.3125 kHz. Then in process 722 the channel is characterized. Next in decision process 724 the loop is qualified for the appropriate tone set and protocol. If the loop does not qualify control returns to process 702. If the loop qualifies control passes to process 730 in which state information is exchanged between the CO and subscriber modems.

Next in decision process 732 a determination is made as to whether there is available processing bandwidth for the modem. If there is control returns to process 702 for the prospective addition of the next channel to the session. If the capacity of the modem is fully utilized then control passes from decision process 732 to process 738 in which run-time communications on all channels is commenced.

In the above discussed system the processing interval in the DFT/IDFT for channels communicated over short loops was an integer fraction of the processing interval for long loops. In an alternate embodiment of the invention there would more than two tone spacings with the standard tone spacing of 4.3125 kHz utilized on intermediate length loops. In this embodiment of the invention longer loops would accorded processing intervals in the DFT/IDFT which are integer multiples of the processing interval for the intermediate loop lengths. In this embodiment as well the shorter loops would continue to be processed at processing interval in the DFT/IDFT which are an integer fraction of the processing interval for the intermediate loops. In still another embodiment of the invention the processing intervals would be either fractional multiples or fractions of the default processing interval of 250 micro seconds.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An X-DSL transceiver configured to couple to at least one subscriber line to communicate at least one multi-tone modulated communication channel thereon; and the X-DSL transceiver comprising:

a digital signal processor (DSP) configured to couple to the at least one subscriber line for multi-tone modulation and demodulation of the at least one communication channel thereon, and the DSP operative during a training phase of the at least one multi-tone modulated communication channel to determine an available range of frequencies on the at least one subscriber line and to expand or contract a tone spacing of each of a fixed number "N" of tones responsive to the determination; and the DSP including:

a Fourier transform module for transforming successive tone sets of the fixed number "N" of tones of the at least one multi-tone modulated communication channel between a frequency domain and a time domain, and the Fourier transform module responsive to the determination to expand the tone spacing by decreasing a processing interval associated with the transformation of each successive tone set between the time and frequency domains and further responsive to the determination to contract the tone spacing by increasing the processing interval associated with the transformation of each successive tone set between the time and frequency domains; and at least one analog front end (AFE) coupled between the at least one subscriber line and the DSP and the at least one AFE configured to perform analog-to-digital and digital-to-analog conversion of the at least one multi-tone modulated communication channel at rates compatible with the processing interval of the Fourier transform module; whereby the range of frequencies spanned on the subscriber line between a lowest frequency one and a highest frequency one of the fixed number "N" of modulated tones of the at least one communication channel includes either a first range of frequencies associated with expanded spacing of each of the "N" tones and generally associated with a short subscriber line or a second, relatively narrower, range of frequencies associated with contracted spacing of each of the "N" tones and generally associated with a relatively long subscriber line.

2. The X-DSL transceiver of claim 1, wherein the at least one AFE further comprises:

a digital-to-analog converter (DAC) coupled to the at least one subscriber line and performing a digital-to-analog conversion of the at least one multi-tone modulated communication channel at a fixed sample rate; and an interpolator coupling the DSP to the DAC, and the interpolator configured to vary an amount of interpolation of the at least one multi-tone modulated communication channel in direct correspondence with a duration of the corresponding processing interval selected by the DSP, whereby tone sets processed in the DSP at the relatively shorter duration processing interval will be subject to relatively smaller amounts of interpolation and vice versa, thereby allowing the DAC to maintain the fixed sample rate.

3. The X-DSL transceiver of claim 1, wherein the at least one AFE further comprises:

an analog-to-digital converter (ADC) coupled to the at least one subscriber line and performing an analog-to-digital conversion of the at least one multi-tone modulated communication channel at a fixed sample rate; and a decimator coupling the ADC and to the DSP, and the decimator configured to vary an amount of decimation of the at least one multi-tone modulated communication channel in direct correspondence with a duration of the corresponding processing interval selected by the DSP, whereby tone sets processed in the DSP at the relatively shorter duration processing interval will be subject to relatively smaller amounts of decimation and vice versa, thereby allowing the ADC to maintain the fixed sample rate.

4. The X-DSL transceiver of claim 1, wherein the at least one subscriber line comprises a plurality of subscriber lines and the at least one multi-tone modulated communication channel comprises a plurality of multi-tone modulated communication channels each associated with a corresponding one of the plurality of subscriber lines; and further comprising:

the DSP configured to independently select for each of the plurality of multi-tone modulated communication channels a corresponding processing interval which inversely corresponds with the available range of frequencies on the associated one of the plurality of subscriber lines.

5. The X-DSL transceiver of claim 1, wherein the DSP supports modulation and demodulation of the at least one multi-tone modulated communication channel in a plurality of multi-tone protocols.

6. The X-DSL transceiver of claim 1, wherein the at least one AFE further comprises:

a digital-to-analog converter (DAC) coupled to the DSP and the at least one subscriber line and the DAC performing a digital-to-analog conversion of the at least one multi-tone modulated communication channel at a sample rate which corresponds inversely with respect to the processing interval selected by the DSP; and an analog-to-digital converter (ADC) coupled to the communication medium and the DSP and the ADC performing an analog-to-digital conversion of the at least one multi-tone modulated communication channel at the sample rate which corresponds inversely with respect to the processing interval selected by the DSP.

7. The X-DSL transceiver of claim 1, wherein the at least one subscriber line comprises a plurality of subscriber lines and the at least one multi-tone modulated communication channel comprises a plurality of multi-tone modulated communication channels each associated with a corresponding one of the plurality of subscriber lines; and further comprising:
   the DSP configured to independently select for each of the plurality of multi-tone modulated communication channels a corresponding processing interval which inversely corresponds with the available range of frequencies on the associated one of the plurality of subscriber lines; and
   a scheduler coupled to the DSP to schedule processing therein of the plurality of multi-tone modulated communication channels based on criteria including associated processing intervals for each of the plurality of multi-tone modulated communication channels.

8. The method of claim 1, wherein the expanded tone spacing of each of the modulated tones substantially corresponds to a 8.625 kHz and the contracted tone spacing of each of the modulated tones substantially corresponds to a 4.3125 kHz tone spacing.

9. A method in an X-DSL transceiver for communicating at least one multi-tone modulated communication channel across a subscriber line; and the method comprising the acts of:
   determining during a training phase of the at least one multi-tone modulated communication channel an available range of frequencies on the at least one subscriber line;
   selecting an expanded or contracted tone spacing for each successive set of a fixed number "N" tones associated with the modulation and demodulation of the at least one multi-tone modulated communication channel responsive to the available range of frequencies determined in the determining act;
   transforming successive tone sets of the fixed number "N" tones of the at least one multi-tone modulated communication channel between a frequency domain and a time domain;
   responding to the selection of an expanded tone spacing in the selecting act by decreasing a processing interval associated with the transformation of each successive tone set between the time and frequency domains; and
   responding to the selection of a contracted tone spacing in the selecting act by increasing a processing interval associated with the transformation of each successive tone set between the time and frequency domains;
   performing analog-to-digital and digital-to-analog conversion of the at least one multi-tone modulated communication channel at rates compatible with the processing interval established in the corresponding one of the responding acts; whereby the range of frequencies spanned on the subscriber line between a lowest frequency one and a highest frequency one of the fixed number "N" of modulated tones of the at least one communication channel includes either a first range of frequencies associated with expanded spacing of each of the "N" tones and generally associated with a short subscriber line or a second, relatively narrower, range of frequencies associated with contracted spacing of each of the "N" tones and generally associated with a relatively long subscriber line.

10. The method of claim 9, wherein the expanded tone spacing of the first responding act substantially corresponds to a 8.625 kHz and the contracted tone spacing of the second responding act substantially corresponds to a 4.3125 kHz tone spacing.

* * * * *